Figure 1:
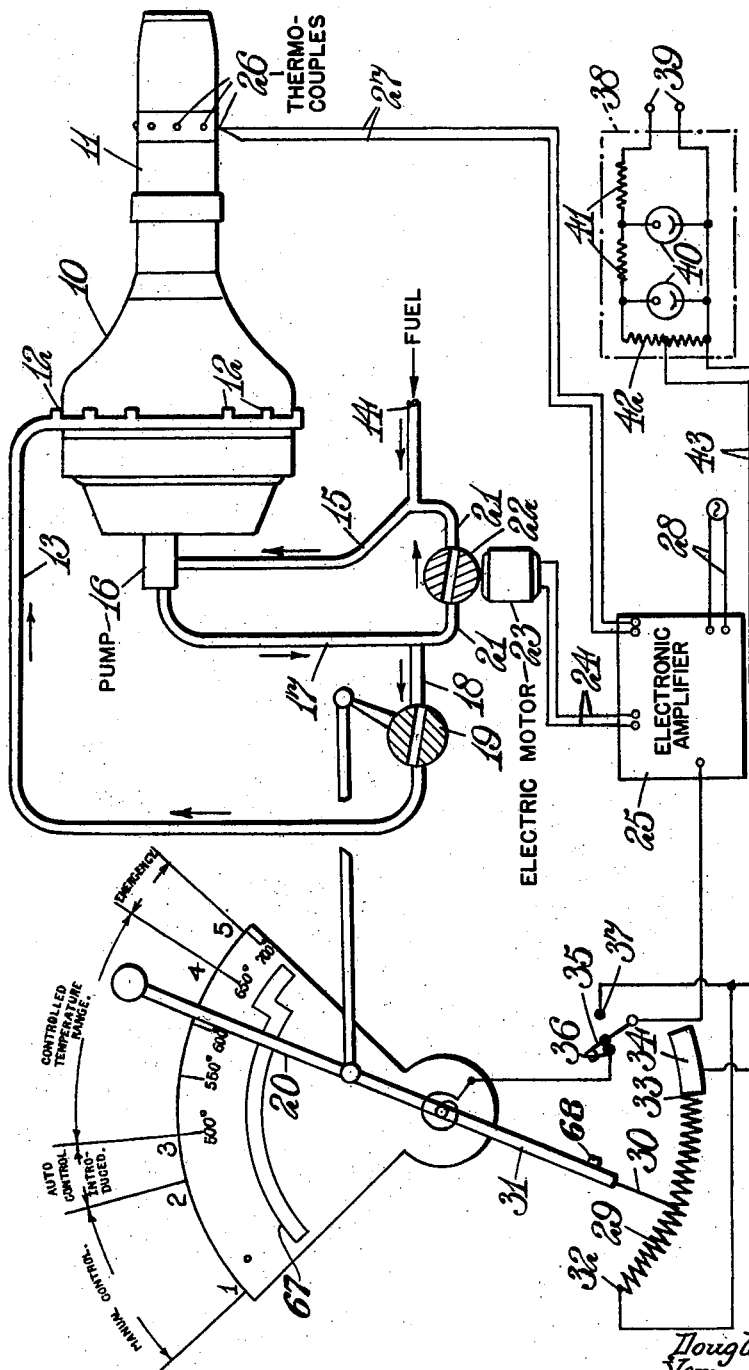

April 14, 1953  D. REYNOLDS ET AL  2,634,579
FUEL CONTROL DEVICE FOR GAS TURBINES
AND JET PROPULSION UNITS
Filed Feb. 24, 1947  2 SHEETS—SHEET 1

Inventors
Douglas Reynolds
Vernon W. Greenhough
and Robin R. Jamison
by Wilkinson & Mawhinney
Attorneys

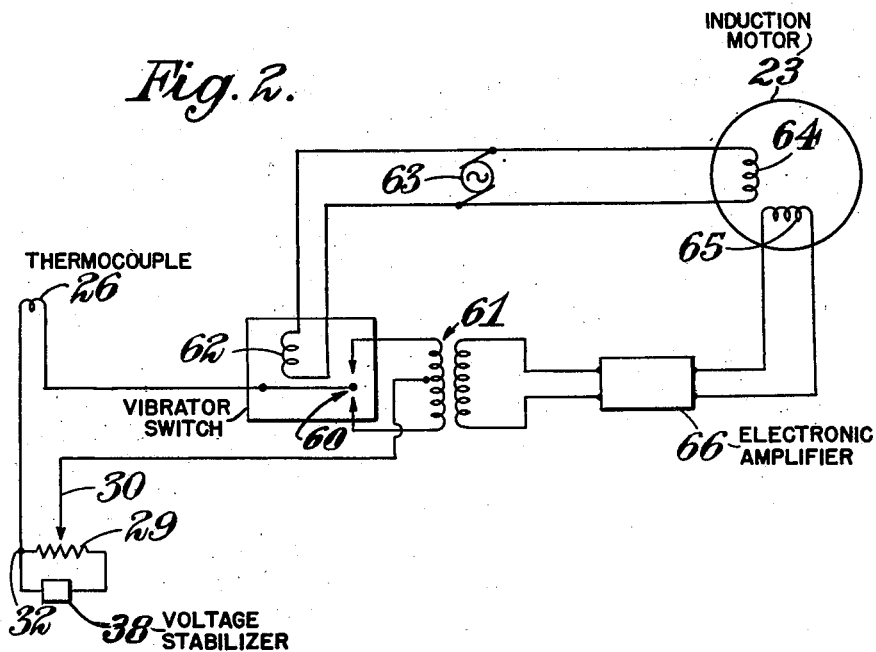

Patented Apr. 14, 1953

2,634,579

UNITED STATES PATENT OFFICE 2,634,579

FUEL CONTROL DEVICE FOR GAS TURBINES AND JET PROPULSION UNITS

Douglas Reynolds, Chellaston, Vernon Wallace Greenhough, Derby, and Robin Ralph Jamison, Chellaston, England, assignors to Rolls-Royce Limited, Derby, England, a British company Application February 24, 1947, Serial No. 730,432
In Great Britain October 10, 1945

Section 1, Public Law 690, August 8, 1946
Patent expires October 10, 1965

7 Claims. (Cl. 60—35.6)

This invention concerns improvements in or relating to automatic controls for internal combustion turbines, of the kind in which there is generated an electric potential proportional to one or more of the operating variables of the turbine which is or are to be controlled and such potential is balanced against a standard potential indicative of a datum value of said operating variable or variables, the arrangement being that departure of the generated potential from the standard results in the transmission of a signal to the automatic control which is therefore brought into operation to adjust said variable(s) to re-establish the datum value thereof and produce equality between the generated and standard potentials.

Heretofore, it has been common practice to provide as a source of the standard potential a battery with which there is associated compensating means to make allowance for voltage variation due to deterioration of the battery so that the voltage output thereof can be reset to the required standard value. The voltage of the battery is usually measured against a standard cell with a view to determining whether the standard voltage is being maintained.

The present invention has for its object to provide an improved automatic control for gas-turbines of the kind set forth in which a battery is dispensed with as a standard source of potential and so that the latter is not variable as described. Moreover, certain other disadvantages associated with the use of a battery in a control for a gas turbine power-plant for aircraft due to freezing of the battery at altitude are eliminated by the present invention.

According to the present invention there is provided in combination with an automatic control for internal combustion turbines of the kind set forth, a stabilising circuit which receives current from a source of supply and provides a constant-voltage current as the standard potential of said automatic control.

Preferably the stabilising circuit comprises one or more gas-discharge tubes which is or are connected between the source of current supply and the automatic control.

In the accompanying drawings:

Figure 1 illustrates, in a purely diagrammatic manner, the application of the invention to a jet-engine for an aircraft, to control the temperature of the gases passing through the turbine and jet, and Figure 2 illustrates diagrammatically the electric connections of the electronic amplifying device illustrated in Figure 1.

Referring to Figure 1 of the drawings, the jet-engine is indicated diagrammatically at 10 with the jet pipe at 11 and fuel-injection devices at 12, these being supplied through a fuel-pipe-line 13.

The fuel-supply is drawn from the usual storage tank by a pipe 14 and passes by the pipe 15 to a pump 16 driven by the engine, thence by the pipes 17 and 18 to a manually controlled valve 19 and to the pipe 13. The valve 19 is controlled from a pilot's throttle-lever 20.

A by-pass pipe 21 is provided from the pipe 18 to the pipe 14 and a valve 22 controls the flow of fuel in this pipe from the outlet of the pump 16 back to the inlet side, thereby regulating the amount of fuel which passes by the pipe 18 and valve 19 to the engine. The valve 22 is controlled by an electric motor 23 supplied with current by the lines 24 from an electronic amplifier indicated diagrammatically by 25.

At a convenient point in the exhaust pipe 11 from the turbine, there is provided a thermo-couple, or a number of thermo-couples 26, and which are subjected to the temperature of the exhaust pipe, or of the gases therein; the electro-motive force generated in the thermo-couples is transmitted by the wires 27 to a converting and electronic amplifying device 25 of any known or convenient kind to effect the automatic control. For this purpose the electro-motive force generated by the thermo-couple is applied to a potentiometer 29 and balanced against a standard electro-motive force supplied from a source generally indicated by the reference numeral 38.

In one arrangement, diagrammatically illustrated in Figure 2, one side of the thermocouple 26 is connected to the end 32 of the resistance 29, while the other is connected through the vibrating switch 60 and dual input transformer 61 to the movable contact 30. The switch 60 is vibrated by the coil 62 connected across the alternator 63. The output of the transformer 61 is fed through a suitable electronic amplifier 66 to one field winding 65 of the induction motor 23. The other field winding 64 is connected across the alternator 63.

The amplifier 66 is selected so that the phase shift across it provides an alternating field due to the field winding 65 which is either 90° or 270° out of phase with the alternating field due to the field winding 64, depending on whether the out of balance voltage of the thermocouple, which is fed into the transformer 61, is positive or negative. If the phase difference is 90°, a rotating field which rotates in one direction will be produced, and if the phase difference is 270° a rotating field which rotates in the opposite direction will be produced. Thus the direction of rotation of the armature of the induction motor 23 depends upon whether the temperature of the thermocouple is above or below the value selected by the movable contact 30.

In this particular form of the invention the movable contact 30 of the potentiometer resistance 29 is carried on an extension 31 of the control-lever 20 which operates the manual fuel-valve 19.

The range of movement of the control lever 20, 31, covers four operating conditions, namely from 1 to 2, "manual control" only; between 2 to 3, the automatic control is brought in; from 3 to 4 is the normal working range, in which the temperature is controlled, and from 4 to 5 is the emergency maximum power range, which is used only on special occasions. In order to prevent accidental movement of the lever beyond the point 4, a gate 67 is preferably provided at this point.

In the first or idling range, the manual valve 19 will be open to only a comparatively small extent, to give a small flow of fuel and no automatic control is needed; this is effected by setting the control, as hereinafter described, to a datum temperature substantially in excess of any temperature that will arise during this range. The automatic valve is thereby rendered inoperative and the control remains solely with the manually operated valve 19.

At any convenient point in the range from 2 to 3, the automatic control is introduced, and the datum temperature selected is the lowest, say 500° C. which is used in normal operation.

Over the range from 3 to 4, the temperature is allowed to rise, giving increasing power-output up to, say 650° C., and in the emergency range a further rise of temperature up to, say, 700° C. is permitted.

The variation of the datum temperature is effected by movement of the contact 30 over the resistance 29.

When the lever 20 is moved backwards from the maximum power position at the point 5, the contact 31 is moved from the point 32 on the resistance 29 until the point 3 is reached by the lever 20. At this point, the contact 30 reaches the point 33 on the resistance and has traversed the full range of the potentiometer resistance 29; on further movement of the lever 20, from point 3 to the point 2, the contact 30 engages and sweeps over an extended contact block 34 so as to maintain the circuit until the point 2, or some position between 3 and 2 is reached. It is thereby ensured that above the selected position between points 2 and 3, the maximum temperature permitted is 500° C. Still further movement of the lever 20 from the point 2 to the point 1 causes the projection 68 on the lever 31 to engage a movable element 35, which operates between contacts 36 and 37 so as to move it from the contact 36 to the contact 37 and thereby connect the contact 30 to the end 32 of the resistance 29. The datum temperature thereby selected is the same as when the contact 30 was at the point 32, namely 700° C. Since this temperature is not attained with a small flow of fuel as controlled by the manual valve 19, the automatic control is inoperative.

In the operation of this device, assuming that the engine is being started from rest, the lever 20 is set to a suitable position within the range 1 and 2, and the supply of fuel is controlled solely by the manual valve 19, the by-pass valve 22 being closed by the operation of the motor 23. As the lever 20 is moved forward, when, or shortly after, it reaches the point 2, the movable element 35 is released so that it engages the contact 36 and the potentiometer resistance 29 is introduced into circuit with the contact 30 at the end 33 thereof. If the jet pipe temperature is above 500° C. the motor 23 is thereby energised and immediately adjusts the by-pass valve 22 to an open position so as to divert part of the flow of fuel from the pump 15 back to the inlet side of the pump, and thereby reduce the temperature to 500° C.

It is thereby ensured that when the lever 20 reaches the point 3, although the manual valve 19 is open sufficiently to pass excess fuel, the by-pass valve 22, being open, prevents such excess flow and maintains the temperature at a point not exceeding 500° C.

Further forward movement of the lever 20 opens the manual valve 19 so that it will permit an increased flow, but this movement of the lever 20 from the point 3 to the point 4 gradually moves the contact 30 over the resistance 29 thereby adjusting the datum temperature, so that the motor 23 is energised so as gradually to close the valve 22 and thereby allow more fuel to pass to the engine, so that the temperature rises and increased power is obtained, and this continues for movement of the lever 20 up to the point 4 and beyond it through the emergency range also.

It will be seen therefore that the only operation required by the pilot is to set the lever 20 at any position, giving the required output from the engine, and the automatic valve 22 is thereby adjusted so as to give a fuel-flow which will cause the temperature in the exhaust pipe 11 to retain the value indicated by the lever 20. If the operating conditions of the aircraft change so that there is a change in the temperature of the exhaust pipe 11, the electro-motive force generated by the thermo-couple 26 is no longer balanced in accordance with the setting of the resistance 29 and therefore causes current to pass from the amplifier to the motor 23 to adjust the valve 22 in the appropriate direction until the desired temperature conditions are re-established.

The source of standard potential for application to the potentiometer bridge is at 38 and this is free from the disadvantages associated with batteries which have previously been used for this purpose.

The source 38 comprises a stabilising circuit connected with a suitable source of power supply 39. Where an electronic amplifier is incorporated as part of the control apparatus the supply 39 may be derived from the high tension supply lines of the amplifier. The stabilising circuit comprises a plurality of gas-discharge tubes 40 and associated resistances 41. Each tube and resistance forms a unit and these are connected in cascade i. e., the resistances are in series with each other and the tubes in parallel with each other. Connected across the output side of the units is a potential divider 42. The latter serves to break down the voltage of the tube circuit to the value required for application to the potentiometer bridge.

The source 38 is connected across the bridge by leads 43.

It will be noted from the drawing that two tube-resistance elements are provided in the stabilising circuit: this, however, may be varied. If a lower degree of stability is required the stabilising circuit will be provided with only one such gas-discharge tube but where greater stability is called for three or more such tubes with their associated resistances are connected in cascade, the arrangement being that the operating voltage of the first tube connected to the source of power supply is a maximum and each following tube in the cascade circuit is at a lower voltage than the preceding one.

An automatic control as described above having a potentiometer bridge which receives a source of standard potential from a stabilising circuit has the advantage that the necessity of checking the standard potential only arises at long intervals and as a consequence the apparatus required for performing these checks need not constitute a permanent part of the automatic control mechanism. As a consequence when the gas turbine is provided for the propulsion of an aircraft (as described above) there is a resulting reduction in the weight of the apparatus carried.

We claim:

1. In a gas-turbine engine the combination of a gas-turbine, a jet-pipe discharging the exhaust from said turbine, an electric gas-discharge tube, a resistance in series therewith, a second resistance in parallel therewith, tappings from said second resistance, a potentiometer connected to said tappings, an adjustable contact movable over said potentiometer, an auxiliary switch operable by said adjustable contact beyond one end of its range of movement to connect said movable contact electrically to the other end of said potentiometer, a thermocouple mounted on said jet-pipe to respond to the temperature of the exhaust therein, an amplifier connected to said adjustable potentiometer-contact and to said thermo-electric couples, an electric motor supplied from said amplifier in accordance with potentials applied to it, a fuel-pump driven by said turbine, fuel-injection devices supplied by said pump, a pipe-connection from the delivery side of said pump to its inlet side, and a valve in said pipe-connection operated by said electric motor.

2. In a gas-turbine engine, the combination of a gas-turbine, a jet-pipe discharging the exhaust from said turbine, an electric gas-discharge tube, a resistance in series therewith, a second resistance in parallel therewith, tappings from said second resistance, a potentiometer connected to said tappings, an adjustable contact movable over said potentiometer, an auxiliary switch operable by said adjustable contact beyond one end of its range of movement to connect said movable contact electrically to the other end of said potentiometer, a thermocouple mounted on said jet-pipe to respond to the temperature of the exhaust therein, an amplifier connected to said adjustable potentiometer-contact and to said thermocouple, an electric motor supplied from said amplifier in accordance with potentials applied to it, a fuel-pump driven by said turbine, fuel-injection devices supplied by said pump, a pipe-connection from the delivery side of said pump to its inlet side, a valve in said pipe-connection operated by said electric motor, a manually controlled valve between said fuel-pump and said fuel-injection devices, and a linkage connecting said valve to said adjustable potentiometer-contact arranged so that said valve is nearly closed when said adjustable potentiometer-contact operates said auxiliary switch.

3. In a gas-turbine engine the combination of a gas-turbine, an electric gas-discharge tube, a resistance in series therewith, a second resistance in parallel therewith, tappings from said second resistance, a potentiometer connected to said tappings, an adjustable contact movable over said potentiometer, an auxiliary switch operable by said adjustable contact beyond one end of its range of movement to connect said movable contact electrically to the other end of said potentiometer, an electric potential generator having an output proportional to the temperature of the exhaust gases, an amplifier connected to said adjustable potentiometer-contact and to said electric potential generator, an electric motor supplied from said amplifier in accordance with potentials applied to it, a fuel-pump driven by said turbine, fuel-injection devices supplied by said pump, a pipe-connection from the delivery side of said pump to its inlet side, and a valve in said pipe-connection operated by said electric motor.

4. In a gas-turbine engine, the combination of a gas-turbine, an electric gas-discharge tube, a resistance in series therewith, a second resistance in parallel therewith, tappings from said second resistance, a potentiometer connected to said tappings, an adjustable contact movable over said potentiometer, an auxiliary switch operable by said adjustable contact beyond one end of its range of movement to connect said movable contact electrically to the other end of said potentiometer, a thermocouple having an output proportional to the temperature of the turbine exhaust and disposed in said jet pipe to be actuated by said exhaust, an amplifier connected to said adjustable potentiometer-contact and to said electric potential generator, an electric motor supplied from said amplifier in accordance with potentials applied to it, a fuel-pump driven by said turbine, fuel-injection devices supplied by said pump, a pipe-connection from the delivery side of said pump to its inlet side, a valve in said pipe-connection operated by said electric motor, a manually controlled valve between said fuel-pump and said fuel-injection devices, and a linkage connecting said valve to said adjustable potentiometer-contact arranged so that said valve is nearly closed when said adjustable potentiometer-contact operates said auxiliary switch.

5. An internal combustion gas-turbine engine comprising in combination a duct through which passes gas heated by combustion, an electrically-operated fuel control valve for varying the quantity of fuel supplied to the engine for combustion therein, a temperature-responsive element in said duct so as to be subjected to the temperature of the gas and defining a voltage of which the value is dependent on said temperature to vary therewith, an electric gas discharge tube, a high potential voltage source, a first resistance connected in series with said discharge tube to said high potential source, a second resistance connected in parallel with said gas discharge tube and said first resistance to said high potential source, a voltage tapping from said second resistance, an electronic amplifier, and a current-controlling device connected to said temperature-responsive element and said voltage tapping to respond to the difference between the voltages thereof and connected through said electronic amplifier to said fuel control valve to control it.

6. An internal combustion gas-turbine engine comprising in combination a duct through which passes gas heated by combustion; a fuel control valve for varying the quantity of fuel supplied to the engine for combustion therein; a temperature-responsive element in said duct so as to be subjected to the temperature of the gas and defining a voltage of which the value is dependent on said temperature to vary therewith; an electric gas discharge tube; a high-potential voltage source; a first resistance connected in series with said discharge tube to said first-potential source; a second resistance connected in parallel with said gas discharge tube and first resistance to said high potential source; a voltage tapping from said second resistance; a signal-generating circuit connected to said temperature-responsive element and said voltage tapping, and arranged to produce an output signal which is representative of the direction of departure of the instantaneous value of the temperature sensed by the temperature-responsive element from a datum value defined by the voltage derived from said tapping; an electronic amplifier; means feeding the output signal from said signal-generating circuit into said electronic amplifier; an electric motor device; means feeding the output from said amplifier to said electric motor device; and means actuating said fuel control valve by said electric motor device to maintain the temperature sensed by said temperature-sensitive element at said datum value.

7. An internal combustion gas-turbine engine comprising in combination a duct through which passes gas heated by combustion, an electrically-operated fuel control valve for varying the quantity of fuel supplied to the engine for combustion therein, a temperature-responsive element in said duct so as to be subjected to the temperature of the gas and defining a voltage of which the value is dependent on said temperature to vary therewith, means for producing a reference potential including a high potential voltage source, a stabilizing circuit consisting of a plurality of gas discharge tubes and associated resistances, the resistances being in series with one another and each resistance being connected in series with its respective discharge tube to said high potential source, the discharge tubes being in parallel with one another, a further resistance connected in parallel with said gas discharge tubes to said high potential source, a voltage tapping from said further resistance, an electronic amplifier, and a current-controlling device connected to said temperature-responsive element and to said voltage tapping to respond to the difference between the voltages thereof and connected through said electronic amplifier to said fuel control valve to control it.

DOUGLAS REYNOLDS.
VERNON WALLACE GREENHOUGH.
ROBIN RALPH JAMISON.

References Cited in the file of this patent
UNITED STATES PATENTS

| Number | Name | Date |
|---|---|---|
| 1,312,899 | Esnault-Pelterie | Aug. 12, 1919 |
| 2,159,181 | Ryder | May 23, 1939 |
| 2,191,997 | Side | Feb. 27, 1940 |
| 2,209,369 | Wills | July 30, 1940 |
| 2,371,889 | Hermitte | Mar. 20, 1945 |